United States Patent
Shah

[11] 3,901,852
[45] Aug. 26, 1975

[54] THERMOPLASTIC POLYURETHANES PREPARED FROM 4,4'-METHYLENEBIS (PHENYL ISOCYANATE)

[75] Inventor: Tilak M. Shah, North Haven, Conn.

[73] Assignee: The Upjohn Company, Kalamazoo, Mich.

[22] Filed: July 29, 1974

[21] Appl. No.: 492,464

[52] U.S. Cl. .................. 260/47 CB; 260/77.5 AM
[51] Int. Cl.² ........................................ C08G 18/65
[58] Field of Search...260/47 CB, 77.5 AD, 77.5 AM

[56] References Cited
UNITED STATES PATENTS

| | | | |
|---|---|---|---|
| 3,016,364 | 1/1962 | Muller ................................. | 260/47 |
| 3,164,565 | 1/1965 | Calamari ............................. | 260/47 |
| 3,420,796 | 1/1969 | Matsubayashi et al. ............. | 260/47 |
| 3,658,756 | 4/1972 | Reuter ................................. | 260/47 |

FOREIGN PATENTS OR APPLICATIONS 1,165,852  10/1961  Germany ....................... 260/47 CB Primary Examiner—Lester L. Lee
Attorney, Agent, or Firm—Denis A. Firth; John Kekich

[57] ABSTRACT

Thermoplastic elastomers having excellent physical properties which are retained at low temperatures are prepared from 4,4'-methylenebis(phenyl isocyanate), polyethylene glycol (M.W. = 600 − 3000) and an extender which is an aliphatic straight chain diol from 3 to 6 carbon atoms or a hydroxyalkylated aromatic compound of the formula

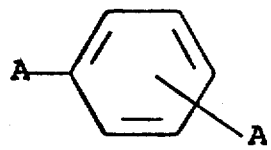

where A represents $HOCH_2-$, $HOCH_2CH_2O-$, and $HOCH_2CH_2OCH_2-$. The proportion in which the reactants are employed is critical and must satisfy each of the following equations:

$$\frac{\text{wt. of polyethylene glycol}}{\text{wt. of extender + wt. of diisocyanate}} = 1 \pm 0.1$$

and $$\frac{\text{Equivs. of diisocyanate}}{\text{Equivs. of (extender + polyethylene glycol)}} = 0.99 \text{ to } 1.5$$

4 Claims, No Drawings

THERMOPLASTIC POLYURETHANES PREPARED FROM 4,4'-METHYLENEBIS (PHENYL ISOCYANATE)

BACKGROUND OF THE INVENTION

1. Field of the Invention

This invention relates to polyurethane elastomers and methods for their preparation and is more particularly concerned with polyurethane elastomers derived from polyethylene glycol, methylenebis(phenyl isocyanate) and certain diol extenders, and with methods for their preparation.

2. Description of the Prior Art

The preparation of polyurethane elastomers from 4,4'-methylenebis(phenyl isocyanate) and a wide variety of polyols including polyethers, is well-known in the art. Those which are commonly used commercially are based on polyester polyols such as polyethylene adipate, polycaprolactone and the like or on polyether glycols such as polytetramethylene glycol and polypropylene glycol. Numerous attempts have been made to prepare useful elastomers, having comparable properties (including thermoplasticity) to those currently available commercially, from polyethylene glycols. The relatively low cost of the latter, compared to the other polyols currently in use, makes it highly desirable to seek to use them if at all possible. However, attempts made hitherto to replace currently employed polyols by polyethylene glycols has resulted in unacceptable deterioration in physical properties and lack of thermoplasticity.

We have now found that, by controlling the proportion of polyethylene glycol to extender within very carefully defined limits and by employing certain extenders in combination with the polyethylene glycols, it is possible to obtain polyurethane elastomers which not only are thermoplastic and possess all the desirable structural strength properties of those elastomers currently available, but possess additional advantages in regard to retention of useful physical properties at relatively lower temperatures than comparable elastomers made using polypropylene glycols or polyesters. These advantages are in addition to the economic advantages which flow from the ability to use a substantially cheaper polyol.

SUMMARY OF THE INVENTION

This invention comprises a thermoplastic polyurethane elastomer having a hardness within the range of Shore A 70 to Shore D 80, which elastomer is the reaction product of:

(i) 4,4'-methylenebis(phenyl isocyanate);
(ii) a polyethylene glycol having a molecular weight within the range of about 600 to about 3000; and
(iii) an extender selected from the class consisting of aliphatic straight chain diols from 3 to 6 carbon atoms, inclusive, dihydroxyalkylated aromatic compounds having the formula

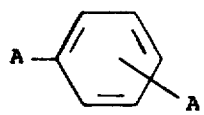

(I)

wherein

A represents a member selected from the class consisting of $HOCH_2-$, $HOCH_2CH_2O-$ and $HOCH_2CH_2OCH_2-$, and mixtures thereof;

characterized in that the above reactants are employed in such proportions as to satisfy both of the following equations:

(a) $$\frac{\text{wt. of polyethylene glycol}}{\text{wt. of extender + wt. of diisocyanate}} = 1 \pm 0.1$$

and (b) $$\frac{\text{Equivs. of diisocyanate}}{\text{Equivs. of (extender + polyethylene glycol)}} = 0.99 \text{ to } 1.05$$

The elastomers of the invention are useful for all purposes, such as gasketry, seals, wear strips, automobile bumpers, tubing, wire and cable coating, and the like, for which polyurethane elastomers are conventionally used. In addition, they are particularly useful in all such applications wherein ability to withstand exposure to low temperatures without losing structural strength is an asset.

The term "aliphatic straight chain diols from 3 to 6 carbon atoms, inclusive" means diols of the formula $HO(CH_2)_nOH$ wherein $n$ is 3 to 6 and there is no branching in the aliphatic chain separating the OH groups. The term is inclusive of 1,3-propanediol, 1,4-butanediol, 1,5-pentanediol, and 1,6-hexanediol.

Illustrative of the dihydroxyalkylated aromatic compounds of formula (I) are the bis(2-hydroxyethyl)ethers of hydroquinone and resorcinol; p-xylene-$\alpha,\alpha'$-diol; the bis(2-hydroxyethyl)ether of p-xylene-$\alpha,\alpha'$-diol; m-xylene-$\alpha,\alpha'$-diol and the bis(2-hydroxyethyl)ether of m-xylene-$\alpha,\alpha'$-diol. The A— groups are preferably in the para or meta position in the compounds of the formula (I).

DETAILED DESCRIPTION OF THE INVENTION

The thermoplastic polyurethane elastomers of the invention can be prepared by processes conventional in the art for the synthesis of polyurethane elastomers. Such processes include the one-shot procedure in which all the reactants are brought together simultaneously, and the prepolymer procedure in which the isocyanate is reacted with the polyol in a first step and the isocyanate-terminated prepolymer so produced is subsequently reacted with the extender. The one-shot is the preferred procedure for preparing the elastomeric polyurethanes of the invention. In a most preferred embodiment the elastomeric polyurethanes of the invention are prepared by a continuous one-shot procedure such as that set forth in U.S. Pat. No. 3,642,924.

Whichever method of preparation is employed, it is found, surprisingly, that the polyurethane elastomers of the invention are thermoplastic and also possess excellent physical properties as measured by modulus, tensile strength, elongation, tensile set, tear strength, compression set. It is also found that these properties are retained substantially upon exposure to temperatures below about 0°C. Further, and equally surprisingly, it has been found that closely related polyurethane elastomers, prepared in identical fashion and from the same reactants as set forth above, but using proportions of reactants which do not meet the requirements of one or both of the equations (a) and (b), supra, show markedly inferior properties in one or more respects.

We have found that this remarkable difference in properties between the polyurethane elastomers of the invention on the one hand and, on the other hand, the closely related polyurethane elastomers which differ only in that the proportions of reactants used therein do not meet the requirements of equations (a) and (b) above, is attributable to a highly critical relationship between the proportion of the "hard" to "soft" segments in the polymer chain. The hard or "rigid" sections are those corresponding to the residues of the diisocyanate and of the extender, the molecules of both of which are relatively inflexible. The soft or "flexible" sections of the molecule are those corresponding to the residues of the polyethylene glycol and are capable of flexing relatively freely.

In order to achieve the desirable properties of the elastomers of the invention, including thermoplasticity, we have found that it is essential to achieve a substantially equal balance, on a weight basis, between the total soft segments present in the molecule and the total hard segments present therein. We have further found that this is true irrespective of how the various segments are arranged in the molecule. Thus, whether the various segments are distributed in random fashion throughout the molecule, as is generally the case when the polymers are made by the one-shot procedure, or whether the segments are arranged in blocks, as is generally the case when the polymers are made by the prepolymer technique, it is found that the desired result is achieved provided that the total weight of the hard segments is substantially equal to the total weight of the soft segments in the molecule.

It is this requirement of equality of weight between the hard and soft segments of the polymers of the invention which is expressed mathematically by the equation (a) set forth above. A second requirement which must be met in preparing the polymers of the invention is that the ratio of equivalents of isocyanate to total equivalents of active hydrogen containing groups in the polyol and extender should be in the range of about 0.99 to 1.05. This requirement is expressed by equation (b) above.

It is found that polymers, which meet the requirements of equations (a) and (b) above and are prepared using the reactants set forth above, possess excellent physical properties as previously enumerated. The corresponding polymers which differ from those of the invention by having a ratio (a) greater than 1.1, possess markedly inferior properties particularly in regard to elasticity. These polymers lack resiliency and are characterized as "dead" polymers whch are highly shrinkable and recover very slowly. Similarly, these polymers which correspond in all respects to the polymers of the invention but which differ only in having a ratio (a) of less than 0.9, possess markedly inferior properties to those of the invention and are characterized by a stiff or boardy feel and behaviour.

As will be apparent to one skilled in the art, the hardness of the elastomers of the invention will vary in accordance with the molecular weight of the polyethylene glycol and the nature of the extender. In general the hardness of the polymers of the invention ranges from a low of a Shore A hardness of 70 to a high of Shore D hardness of 80, the lower hardnesses being characteristic of polyethylene glycols having molecular weights in the lower end of the range set forth above used in combination with aliphatic diol extenders. The higher hardnesses are characteristic of the polyethylene glycols in the higher end of the molecular weight range set forth above used in combination with the aromatic extenders.

As set forth above, the polyurethane elastomers of the invention are preferably made by the one-shot procedure and most preferably by a continuous one-shot procedure. In such procedures the reactants are brought together in any order. Advantageously, the polyols, i.e. the polyethylene glycol and the extender, are preblended and fed to the reaction mixture as a single component, the other major component being the diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25°C) and the resulting mixture is then heated to a temperature of the order of about 40°C to about 130°C, preferably to a temperature of about 90°C to about 120°C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20°C to about 115°C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N,',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the diisocyanate and the polyethylene glycol are reacted, if desired, in the presence of a catalyst as defined above, in a preliminary stage to form an isocyanate-terminated prepolymer. The proportions of diisocyanate and polyethylene glycol employed in the preparation of this prepolymer are consistent with the ranges defined above. The diisocyanate and the polyethylene glycol are preferably rendered substantially free from the presence of extraneous moisture, using the methods described above, before the formation of the prepolymer is carried out. The formation of the prepolymer is advantageously carried out at a temperature within the range of about 70°C to about 130°C under an inert atmosphere such as nitrogen gas in accordance with conventional procedures. The prepolymer so formed can then be reacted, at any desired time, with the extender diol to form the elastomers of the invention. This reaction is carried out advantageously within the range of reaction temperatures specified above for the one-shot procedure. In general the prepolymer and the extender are mixed and heated within the requisite temperature range while the mixture is degassed as described previously. The degassed mixture is then transferred to a suitable mold, extrusion apparatus, or the like, and cured as described for the one-shot procedure.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The following examples describe the manner and process of making and using the invention and set forth the best mode contemplated by the inventors of carrying out the invention but are not to be construed as limiting.

EXAMPLE 1

A series of elastomers was prepared from 4,4'-methylenebis(phenyl isocyanate) and varying proportions of a polyethylene glycol having a molecular weight of 1540 (Carbowax 1540) and the bis(2-hydroxyethyl ether) of hydroquinone using the following standard procedure:

The polyethylene glycol was degassed by heating under reduced pressure at 110°C for 30 minutes. To the resulting material was added with stirring the hydroquinone bis(2-hydroxyethyl ether) and the resulting mixture was again degassed at 110°C under reduced pressure for 30 minutes. To the resulting product, still at 110°C, was added 0.024 percent (by weight of total reactants) of stannous octoate followed by the 4,4'-methylenebis(phenyl isocyanate). The mixture so obtained was subjected to high speed mechanical stirring for 15 seconds and then poured into a shallow aluminum tray. The poured elastomer and tray were allowed to stand at room temperature (circa 20°C) for 24 hours. Thereafter the elastomer was chopped into pieces, granulated and dried for 3 hours at 110°C. The dried material was then injection molded to form a sheet (4.5 × 4.5 × 1/16 inches) for test purposes. The resulting sheet was postcured for 16 hours at 115°C followed by 7 days at room temperature (circa 20°C). The cured elastomer was then subjected to physical testing.

In Table I below are recorded the proportions (in moles) of ingredients employed in the preparation of four elastomers in accordance with the above process together with physical properties of the postcured pressed sheets derived from the elastomers as described above. Ratios (a) and (b) quoted in the Table I represent the result of solving Equations (a) and (b), supra, for each polymer.

TABLE I

| Elastomer | A | B | C | D |
|---|---|---|---|---|
| 4,4'-methylenebis(phenyl isocyanate) | 1.03 | 1.03 | 1.03 | 1.03 |
| Polyethylene glycol (M.W. 1540) | 0.33 | 0.286 | 0.25 | 0.22 |
| Bis(2-hydroxyethyl ether)-hydroquinone | 0.66 | 0.714 | 0.75 | 0.78 |
| Ratio (a) | 1.30 | 1.10 | 0.946 | 0.820 |
| Ratio (b) | 1.03 | 1.03 | 1.03 | 1.03 |
| Hardness: Shore A | 85 | 89 | 91 | 94 |
| Shore D | 35 | 41 | 43 | 45 |
| Modulus psi: | | | | |
| 50% | 750 | 910 | 1210 | 1450 |
| 100% | 1000 | 1170 | 1750 | 1890 |
| 200% | 1370 | 1520 | 2520 | 2330 |
| 300% | 1730 | 1920 | — | 2790 |
| Tensile strength: psi | 3270 | 3580 | 3060 | 4290 |
| Elongation at break: % | 630 | 590 | 520 | 500 |
| Tensile set at break: % | 86 | 90 | 80 | 75 |
| Tear strength: Die C: psi | — | 840 | 800 | 1090 |
| Compression set: % | — | 27 | 22 | 27 |
| Clash-Berg modulus, $T_f$, °C | −42 | −40 | −34 | −30 |
| Density: g./cc. | 1.22 | 1.23 | 1.24 | 1.24 |

It was observed that Elastomer A, which is outside the scope of the invention, was a "dead" elastomer showing very slow recovery when flexed by hand. Elastomer D, which is also outside the scope of the invention, exhibited marked boardiness and stiffness when manipulated by hand. In contrast, Elastomers B and C, which are within the scope of the present invention, were of excellent appearance, exhibited snaplike recovery when flexed and gave no evidence of boardiness or stiffness.

EXAMPLE 2

Using exactly the same procedure described in Example 1 but replacing the polyethylene glycol there used by a polyethylene glycol of molecular weight 1000 (Carbowax 1000), a second series of elastomers was prepared with varying ratios of polyethylene glycol to extender. The proportions of ingredients, the ratios (a) and (b) and the physical properties of this series of elastomers are recorded in Table II below.

TABLE II

| Elastomer | E | F | G |
| --- | --- | --- | --- |
| 4,4'-methylenebis(phenyl isocyanate | 1.03 | 1.03 | 1.03 |
| Polyethylene glycol (M.W. 1000) | 0.4 | 0.5 | 0.286 |
| Bis(2-hydroxyethyl ether)-hydroquinone | 0.6 | 0.5 | 0.714 |
| Ratio (a) | 1.06 | 1.40 | 0.715 |
| Ratio (b) | 1.03 | 1.03 | 1.03 |
| Hardness: Shore A | 87 | — | 92 |
| Shore D | 46 | — | 49 |
| Modulus psi: | | | |
| 50% | 900 | — | 2020 |
| 100% | 1280 | — | 2420 |
| 150% | 1620 | — | 2750 |
| 200% | 1910 | — | 2990 |
| Tensile strength: psi | 3090 | — | 3970 |
| Elongation at break: % | 660 | — | 570 |
| Tensile set at break: % | 100 | — | 100 |
| Tear Strength: Die C: psi | 850 | — | 1250 |
| Compression set: % | 29.4 | — | 35.4 |
| Clash-Berg modulus, $T_f$, °C | −34 | — | −23 |
| Density: g./cc. | 1.23 | — | 1.25 |

Elastomer E, which is within the scope of the present invention, showed high resilience and snap on flexing and was free from any evidence of boardiness or stiffness. In contrast, Elastomer G, which is outside the scope of the present invention (ratio (a) is less than 0.9), exhibited marked boardiness and stiffness. Elastomer F, which is also outside the scope of the present invention (ratio (a) is greater than 1.1), shrank badly on molding and was therefore not tested for physical properties.

EXAMPLE 3

Using the procedure described in Example 1, but replacing the polyethylene glycol there used by a polyethylene glycol of molecular weight 600 (Carbowax 600) and using 1.03 mole of 4,4'-methylenebis(phenyl isocyanate), 0.555 mole of polyethylene glycol and 0.445 mole of bis(2-hydroxyethyl ether) of hydroquinone, there was obtained an Elastomer H having the following properties (pressed sheet postcured as described in Example 1)

| | |
| --- | --- |
| Ratio (a) | 0.961 |
| Ratio (b) | 1.03 |
| Hardness: Shore A | 88 |
| Shore D | 39 |
| Modulus psi: | |
| 50% | 1050 |
| 100% | 1500 |
| 200% | — |
| 300% | 2480 |
| Tensile strength: psi | 3240 |
| Elongation at break: % | 480 |
| Tensile set at break: % | 30 |
| Compression set: % | 341 |
| Clash-Berg modulus, $T_f$, °C | −14 |

This elastomer, which is within the scope of the invention, exhibited resiliency and was free from any evidence of boardiness or stiffness.

Two further elastomers (I and J) were prepared using exactly the same procedure with the polyethylene glycol of molecular weight 600 but differing proportions of glycol to extender. The molar proportions of reactants and values of ratios (a) and (b) for the two elastomers were as follows:

| Elastomer | I | J |
| --- | --- | --- |
| 4,4'-methylenebis(phenyl isocyanate) | 1.03 | 1.03 |
| Polyethylene glycol (M.W. 600) | 0.5 | 0.65 |
| Bis(2-hydroxyethyl ether)-hydroquinone | 0.5 | 0.35 |
| Ratio (a) | 0.84 | 1.19 |
| Ratio (b) | 1.03 | 1.03 |

It was found that neither of these polymers, both of which are outside the scope of the invention, could be molded satisfactorily to give a sheet for test purposes.

EXAMPLE 4

Using exactly the procedure of Example 1 but replacing the bis(2-hydroxyethyl ether) of hydroquinone there used as extender by 1,4-butanediol, in the proportions set forth in Table III, there were obtained two elastomers which, after pressing and postcuring in accordance with the procedure of Example 1, were found to possess the listed properties.

TABLE III

| Elastomer | K | L |
| --- | --- | --- |
| 4,4'-methylenebis(phenyl isocyanate) | 1.03 | 1.03 |
| Polyethylene glycol (M.W. 1540) | 0.2 | 0.166 |
| 1,4-butanediol | 0.8 | 0.834 |
| Ratio (a) | 0.930 | 0.766 |

TABLE III-continued

| Elastomer | K | L |
|---|---|---|
| Ratio (b) | 1.03 | 1.03 |
| Hardness: Shore A | 88 | 94 |
| Shore D | 42 | 49 |
| Modudlus psi: | | |
| 50% | 840 | 1330 |
| 100% | 1110 | 1620 |
| 200% | — | 2390 |
| 300% | 2420 | 3740 |
| Tensile strength: psi | 5220 | 5670 |
| Elongation at break: % | 490 | 390 |
| Tensile set at break: % | 30 | 25 |
| Compression set: % | 38.4 | 67.8 |
| Clash-Berg modulus, $T_f$, °C | −33 | −24 |

Elastomer L, which is outside the scope of the invention (ratio (a) is less than 0.9), was stiff and boardly whereas Elastomer K showed excellent resiliency and feel.

EXAMPLE 5

Using the procedure described in Example 1, but replacing the polyethylene glycol there used by a polyethylene glycol of molecular weight 2000 there was prepared a series of three elastomers using the reactants and proportions set forth in Table IV below.

TABLE IV

| Elastomer | M | N | O |
|---|---|---|---|
| 4,4'-methylenebis(phenyl isocyanate) | 1.03 | 1.03 | 1.03 |
| Polyethylene glycol (M.W. 2000) | 0.25 | 0.20 | 0.166 |
| Bis(2-hydroxyethyl ether)-hydroquinone | 0.75 | 0.80 | 0.834 |
| Ratio (a) | 1.23 | 0.96 | 0.78 |
| Ratio (b) | 1.03 | 1.03 | 1.03 |
| Hardness: Shore A | 87 | 92 | 94 |
| Shore D | 40 | 48 | 55 |
| Modulus psi: | | | |
| 50% | 950 | 1200 | 1600 |
| 100% | 1150 | 1620 | 2120 |
| 300% | 1790 | 2280 | 2700 |
| Tensile strength: psi | 3200 | 3250 | 3800 |
| Elongation at break: % | 590 | 520 | 450 |
| Tensile set at break: % | 80 | 80 | 75 |
| Compression set: % | 30 | 27 | 25 |
| Clash-Berg modulus, $T_f$, °C | −41 | −35 | −23 |

Elastomer N, which is within the scope of the present invention, showed good resiliency and was free from any evidence of boardiness or stiffness. In contrast, Elastomer M (ratio (a) above 1.1) was a very dead polymer and Elastomer O (ratio (a) below 0.9) was characterized by stiffness and boardiness.

I claim:

1. A thermoplastic polyurethane elastomer having a hardness within the range of about Shore A 70 to Shore D 80 which elastomer comprises the reaction product of
   i. 4,4'-methylenebis(phenyl isocyanate);
   ii. a polyethylene glycol having a molecular weight within the range of about 600 to about 3000; and
   iii. an extender selected from the class consisting of (1) aliphatic straight chain diols from 3 to 6 carbon atoms, inclusive, (2) dihydroxyalkylated aromatic compounds having the formula

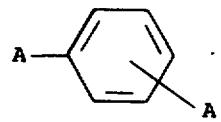

wherein
A represents a member selected from the class consisting of $HOCH_2-$, $HOCH_2CH_2O-$, and $HOCH_2CH_2OCH_2-$, and (3) mixtures thereof; characterized in that the above reactants are employed in such proportions as to satisfy both of the following equations:

(a) $$\frac{\text{wt. of polyethylene glycol}}{\text{wt. of extender + wt. of diisocyanate}} = 1 \pm 0.1$$

and (b) $$\frac{\text{Equivs. of diisocyanate}}{\text{Equivs. of (extender + polyethylene glycol)}} = 0.99 \text{ to } 1.05.$$

2. A polyurethane elastomer according to claim 1 wherein the extender is the bis(2-hydroxyethyl ether) of hydroquinone.

3. A polyurethane elastomer according to claim 1 wherein the extender is 1,4-butanediol.

4. A polyurethane elastomer according to claim 1 wherein the polyethylene glycol has a molecular weight in the range of about 1000 to about 2500.

* * * * *